United States Patent [19]

Toyoda et al.

[11] Patent Number: 5,210,405
[45] Date of Patent: May 11, 1993

[54] PEN-TYPE INPUT DEVICE FOR COMPUTERS HAVING BALL WITH ROTATIONAL SENSORS

[75] Inventors: Ryuichi Toyoda, Yokohama; Takeshi Masaki, Kawasaki; Kimikatsu Sato, Sagamihara, all of Japan

[73] Assignee: Matsushita Electric Industrial Co., Ltd., Osaka, Japan

[21] Appl. No.: 754,575

[22] Filed: Sep. 4, 1991

[30] Foreign Application Priority Data

Sep. 5, 1990 [JP] Japan .................. 2-236735

[51] Int. Cl.$^5$ .............................................. G01V 9/04
[52] U.S. Cl. .................................... 250/221; 340/710
[58] Field of Search ............ 250/221, 229, 231.16; 340/709, 710; 33/1 M

[56] References Cited

U.S. PATENT DOCUMENTS

| | | | |
|---|---|---|---|
| 4,780,707 | 10/1988 | Selker | 340/710 |
| 4,933,670 | 6/1990 | Wislocki | 340/709 |
| 5,008,528 | 4/1991 | Duchon | 250/221 |

FOREIGN PATENT DOCUMENTS 0120424  6/1985  Japan ..................... 340/710

Primary Examiner—David C. Nelms
Assistant Examiner—Que T. Le
Attorney, Agent, or Firm—Pollock, Vande Sande & Priddy

[57] ABSTRACT

A pen-type input device for computers includes a ball rotatably supported by an end of a pen-like elongate handle and rotatable in response to the movement of the pen-type input device for causing one or both of first and second rotating detection members to rotate about their own axes extending perpendicular to one another, and a pattern on each respective rotating detecting member having a series of alternating light-reflecting portions and light-absorbing portions for receiving light projected from a light-emitting device and for reflecting light back to a light-sensitive device which in turn sends an electric detection signal to a detecting circuit of a circuit board. The direction of rotation and the amount of movement of each respective rotating member is detected by the detecting circuit and the detected data are sent to a computer whereby a curve corresponding to the movement of the ball is created on a display surface of the computer.

10 Claims, 3 Drawing Sheets

PEN-TYPE INPUT DEVICE FOR COMPUTERS HAVING BALL WITH ROTATIONAL SENSORS

BACKGROUND OF THE INVENTION

1. Field of the Invention

The present invention relates to a pen-type input device used in a computer system for causing a cursor to move on a display surface and entering data about graphic patterns and characters into a computer.

2. Description of the Prior Art

Conventional input devices for use with computers include a keyboard, a mouse, a digitizer, a light-pen, a tablet, etc. Among these input devices, the mouse is a device that can be moved on the surface of a tablet or the like, causing a cursor to move to a corresponding point on the screen of a cathode ray tube (CRT). The mouse is capable of moving the cursor at high speeds by a relatively simple manual operation and is able to create graphic patterns, marks or characters freely on the display surface. The mouse is divided broadly into two categories by the system used for the detection of the amount of movement of the mouse. The mouse falling in the first category has a ball rotatable in response to the movement of the mouse for detecting the amount of movement of the mouse, while the mouse in the second category includes a photosensor for detecting the amount of movement of the mouse while the mouse is being moved on a flat surface provided with a grid or network of evenly spaced horizontal and vertical lines.

The mouse can be used in various manners depending on the software used to control the operations of a computer system. When used in computer graphics for creating a mark or a free curve on the display surface, the mouse is moved in such a direction that a cursor is moved in a desired direction.

However, due to its size and construction, the mouse cannot be moved finely. In addition, a direct monitoring of the movement of the mouse is not possible. It is, therefore, almost impossible for the mouse to perform an appropriate input of data on a fine figure or character into a computer.

SUMMARY OF THE INVENTION

With the foregoing drawbacks of the prior art in view, it is an object of the present invention to provide a pen-type input device which is capable of performing an accurate inputting of data about a desired graphic pattern, mark or character into a computer.

Another object of the present invention is to provide a pen-type input device for computers which is compact in size and light in weight and can be manufactured at a low cost.

According to the invention, there is provided a pen-type input device for a computer, which comprises (a) a pen-like elongate handle; (b) a ball rotatably supported by the handle with a portion of the ball projecting outwardly from an end of the handle; (c) first and second rotating detection members mounted in the handle and rotatable, upon frictional engagement with the ball, about first and second axes, respectively, the first and second axes being perpendicular to one another; (d) first and second patterns each composed of a series of alternating light-reflecting portions and light-absorbing portions disposed circumferentially along a periphery of a corresponding one of the first and second rotating detection members for detecting a direction of rotation of the ball and an amount of movement of the ball; (e) first and second circuit boards mounted in the handle and each having a detecting circuit; (f) first and second photodetectors each composed of a light-emitting device and a light-sensitive device and packaged on the first and second circuit boards, respectively, in corresponding relation to the first and second rotating detection members, respectively; and (g) means defining first and second light paths extending such that light emitted from the respective light-emitting devices is guided through the first and second light paths onto the first and second patterns and light reflected back from the first and second patterns is guided through the first and second light paths onto the respective light-sensitive devices.

Preferably, the pen-type input device further includes a magnet mounted in the handle for attracting the ball into contact with the first and second rotating detection members.

In order to detect the direction of rotation and the amount of movement of the rotating detection members, each of the first and second rotating detection members may further include a third pattern of a series of alternating light-reflecting portions and light-absorbing portions disposed circumferentially along the periphery of a corresponding one of the first and second rotating detection members and arranged out of phase with the light-reflecting portions and the light-absorbing portions of the pattern of the corresponding rotating detection member. In this instance, each of the first and second photodetectors further includes an additional light-sensitive device; and the defining means further defines a third light path extending such that light emitted from the light-emitting device is guided through the third light path onto the first and third patterns or the second and third patterns and light reflected back from the first and third patterns or the second and third patterns is guided through the third light path onto the additional light-sensitive device.

Each of the first and second rotating detection members may be composed of a core shaft having a small-diameter portion and a large-diameter portion integral frictionally engageable with the ball, and a pattern pipe having an outside diameter substantially equal to the outside diameter of the large-diameter portion of the core shaft and firmly fitted over the small-diameter portion of the core shaft. The pattern pipe has on its outer peripheral surface each respective pattern of alternating light-reflecting portions and light-absorbing portions. The pattern pipe may be made of metal, in which instance the light-reflecting portions are composed of mirror-finished portions of the outer peripheral surface of the metal pattern pipe, while the light-absorbing portions are composed of satin-finished portions of the outer peripheral surface of the metal pattern pipe. As an alternative, the pattern pipe may be molded of a synthetic resin. In this instance, the light-reflecting portions are composed of mirror-like, smooth, reflective surface portions of the outer peripheral surface of the molded pattern pipe, while the light-absorbing portions are composed of satin-like surface portions of the outer peripheral surface of the molded pattern pipe. The synthetic resin may be admixed with a finely divided inorganic material or a powdered metal.

In addition, it is preferable that the ball is disposed in alignment with a longitudinal central axis of the pen-like elongated handle.

When the pen-type input device, while being gripped by user's fingers, is moved in a direction while the ball is being forced against the surface of a table, for example. the ball rotates in a direction, causing one or both of the rotating detection members to rotate about their own axes. In this instance, the light-emitting devices emit light which in turn is guided by the light paths onto the patterns on the respective rotating detection members. Light reflected back from the light-reflecting portions of each pattern is guided through the corresponding light path onto the light-sensitive device. The light-sensitive device sends a detected signal to the detecting circuit of the circuit board which in turn detects the direction of rotation and the amount of movement of each respective rotating detection member. Data on the direction of rotation and the amount of movement is inputted into a mainframe of a computer whereby a figure, a mark or a character which corresponds to one drawn by the pen-type input device is created on the screen of a display unit. Since the rotating detection members are held in direct contact with the ball, the direction of rotation of the ball and the amount of rotation of the ball can be detected accurately by the rotating detection members. The photodetectors composed of light-emitting devices and the light-sensitive devices are packaged on the circuit boards so that the overall length of a detection system can be reduced.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The present invention will be described in greater detail with reference to certain preferred embodiments shown in the accompanying drawings.

Figure 1A:
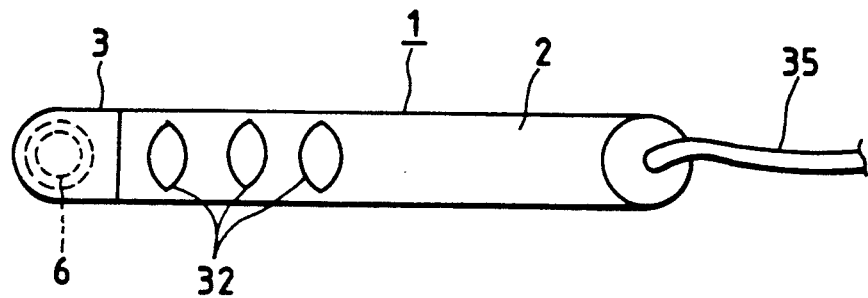
FIG. 1(a) is a plan view of a pen-type input device for computers according to the present invention.
Figure 1B:
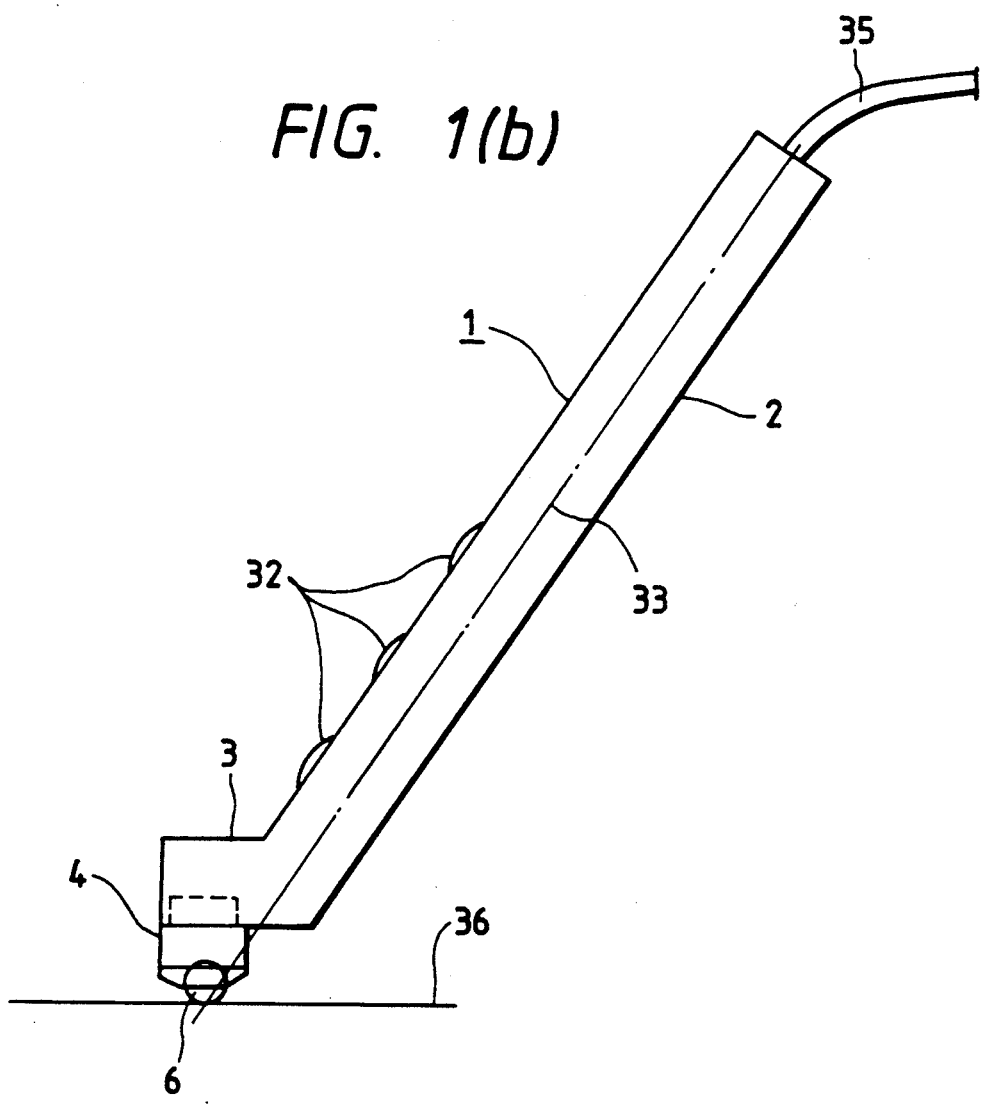
FIG. 1(b) is a front elevational view of the pen-type input device.

As shown in FIGS. 1(a) and 1(b), a pen-type input device 1 according to the present invention includes a pen-like elongated handle 2 having a front end portion 3 bent at an obtuse angle relative to a body of the handle 2, and a head unit 4 attached to the front end portion 3 of the handle 2.

Figure 2A:
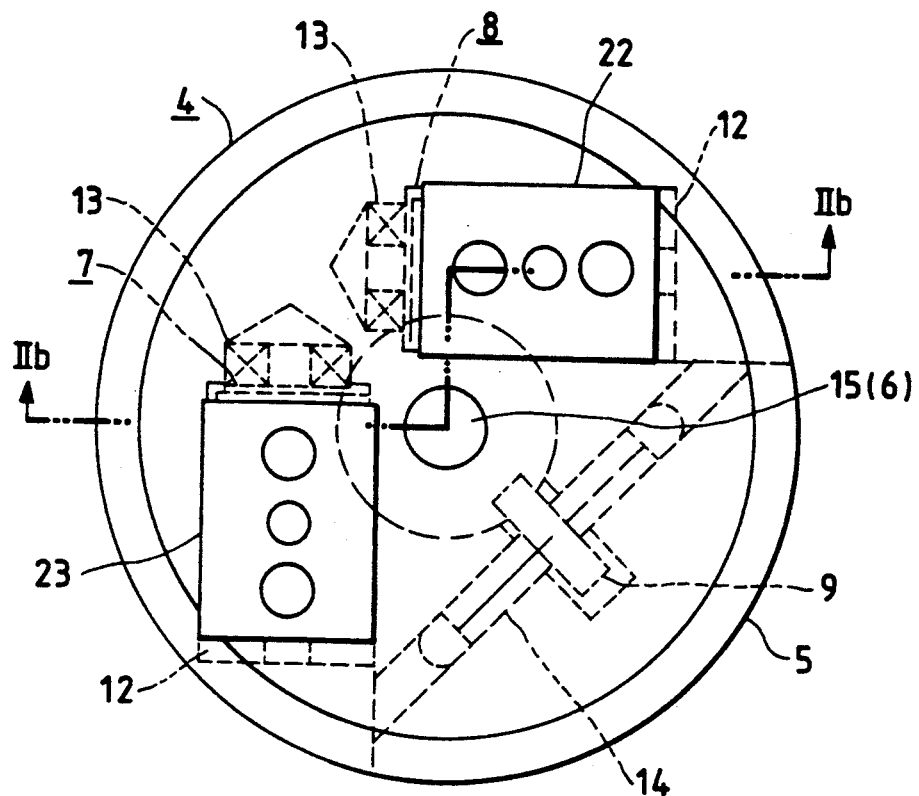
FIG. 2(a) is an enlarged plan view of a main portion of the pen-type input device.
Figure 2B:
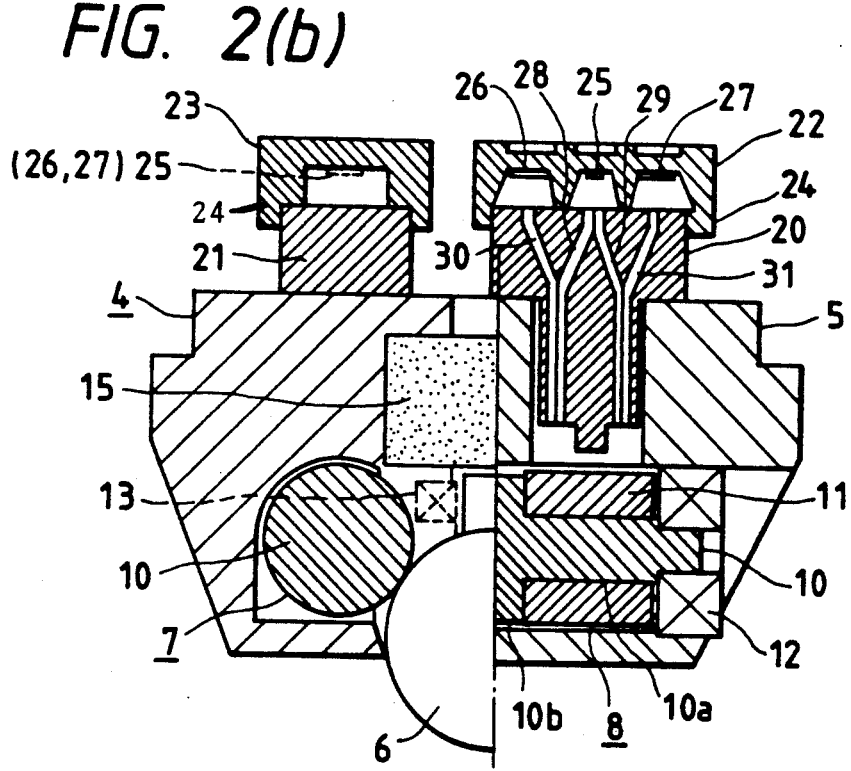
FIG. 2(b) is a cross-sectional view taken along line IIb—IIb of FIG. 2(a)

The head unit 4 includes, as shown in FIGS. 2(a) and 2(b), a support member 5 on which are mounted a steel ball 6, first and second rotating detection members 7, 8 for outputting the amount of movement of the ball 6 in each of two directions (x-axis direction and y-axis direction) perpendicular to one another, and a bearing 9 for supporting the ball 6. Each of the first and second rotating detection members 7, 8 is composed of a core shaft 10 and a pattern pipe 11. The core shaft 10 includes a small-diameter portion 10a and a large-diameter portion 10b integral with an end of the small-diameter portion 10a. The pattern pipe 11 has an outside diameter substantially equal to the outside diameter of the large-diameter portion 10b of the core shaft 10 and is firmly fitted over the small-diameter portion 10a of the core shaft 10 (see FIG. 3(b)). Each of the rotation detection members 7, 8 is rotatably supported at its opposite ends by a pair of bearings 12, 13 mounted on the support member 5. The bearing 9 is rotatably mounted on a shaft 14 supported on the head unit 4 by means of the support member 5. The head unit 4 further includes a permanent magnet 15 disposed behind the ball 6 for magnetically attracting or pulling the ball 6 into contact with the respective large-diameter portions 10b of the core shafts 10 of the first and second rotating detection members 7, 8 and also with the bearing 9. Thus, the ball 6 is rotatably supported by the head unit 4 with a portion of the ball 6 projecting outwardly from the head unit 4 which is connected to the front end 3 of the handle 2. When the ball 6 is rotated, the rotation of the ball 6 is transmitted to the rotating detection members 7, 8, causing the rotating detection members 7, 8 to rotate together with the ball 6.

Figure 3A:
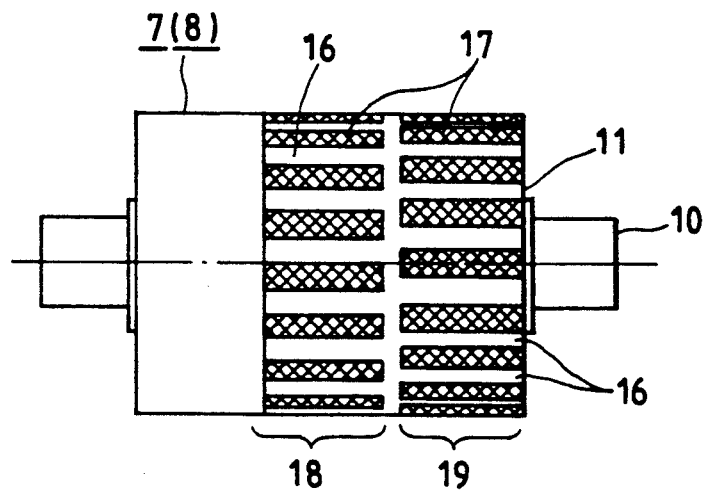
FIG. 3(a) is an enlarged front elevational view of a transducer output shaft of the pen-type input device.
Figure 3B:
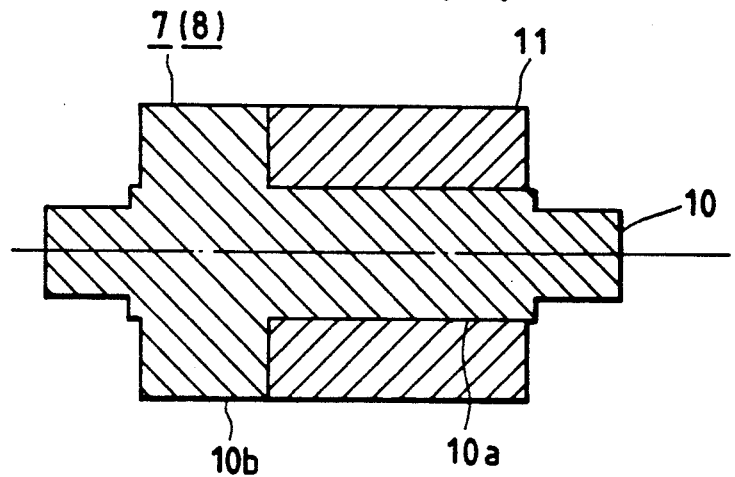
FIG. 3(b) is a longitudinal cross-sectional view of the transducer output shaft.

As shown in FIG. 3(a), the pattern pipe 11 mounted on each of the first and second rotating detection members 7, 8 has a pair of laterally spaced patterns 18, 19 of alternating transverse elongated light-reflecting portions 16 and light-absorbing portions 17 disposed circumferentially along an outer peripheral surface of the pattern pipe 11. The light-reflecting portions 16 and the light-absorbing portions 17 of one pattern 18 or 19 are disposed out of phase with the light-reflecting portions 16 and the light-absorbing portions 17 of the other pattern 19 or 18 by ¼ pitch in the circumferential direction of the pattern pipe 11. The pattern pipe 11 is made of metal, for example. In this instance, a portion of the outer peripheral surface of the pattern pipe 11 which constitutes the light-reflecting portions 16 of the pattern pipe 11 is mirror-finished, while the remainder of the outer peripheral surface of the pattern pipe 11, which constitutes the light-absorbing portions 17, is satin-finished by etching. The pattern pipe 11 may be molded of a synthetic resin such as an acrylonitrile-butadiene-styrene (ABS) resin or an acrylic resin in which instance the light-reflecting portions 16 are composed of mirror-like, smooth, reflective surfaces formed by mirror-finished surface portions of a mold used for molding the pattern pipe, while the light-absorbing portions 17 are composed of satin-like surfaces formed by satin-finished surface portions of the mold. In order to improve the reflectivity of the light-reflecting portions 16, a finely divided inorganic material or a powdered metal may be admixed with the synthetic resin, if necessary.

As shown in FIGS. 2(a) and 2(b), the support member 5 is provided with first and second light-path defining means 20, 21 disposed in confrontation to the pattern pipes 11 of the first and second rotating detection members 7, 8, respectively. The light-path defining means 20, 21 are composed of substantially rectangular blocks and have respective upper portions to which respective legs 24 of first and second circuit boards 22, 23 are attached. Each of the circuit boards 22, 23 has a detecting circuit and is packaged with a photodetector. The photodetector is composed of a light-emitting device 25 disposed at the center of the underside of each respective circuit board 22, 23, and a pair of light-sensitive devices 26, 27 disposed on opposite sides of the light-emitting device 25. The light-emitting device 25 is used for emitting light onto the pair of patterns 18, 19 on each pattern pipe 11, while the light-sensitive devices 26, 27 are used for detecting light reflected back from the pair of patterns 18, 19, respectively. Each of the light-path defining means or blocks 22, 23 is molded of an acrylic resin and has a pair of first light paths 28, 29 extending such that light emitted from the light-emitting device 25 is guided through the first light paths 28, 29 onto the respective patterns 18, 19, and a pair of second light paths 30, 31 extends such that light reflected back from the respective patterns 18, 19 is guided through the second light paths 30, 31 onto the corresponding light-sensitive devices 26, 27. The first and second light paths 28-31 may be defined by optical fibers. Since the photodetectors each composed of the light-emitting device 25 and the light-sensitive devices 26, 27 are packaged on the circuit boards 22, 23, the positioning between the photodetectors and the light paths 28-31 can be performed easily and accurately. In addition, a considerable reduction of the overall length of such optical detecting system is possible.

As shown in FIGS. 1(a) and 1(b), the handle 2 is provided with a plurality of switches 32 (three in the illustrated embodiment) for controlling an input operation. The switches 32 are located closer to the front end 3 of the handle 2 than to the rear end of the handle 2 so as to ensure that the user while gripping the handle 2 with his fingers is able to actuate the switches 32 with utmost ease by using at least one of the fingers. The ball 6 on the head unit 4 (a projected end of the ball 6, in particular) is preferably disposed in alignment with a longitudinal central axis 33 of the elongated handle 2 of the pen-type input device 1, as shown in FIG. 1(a) for a reason described below.

Figure 4:
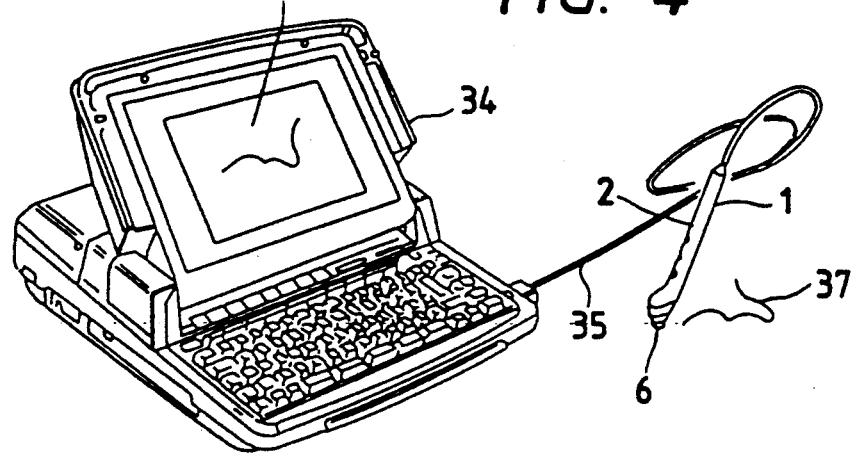
FIG. 4 is a diagrammatical perspective view showing the manner in which the pen-type input device is used with a computer.

In use, the pen-type input device 1 of the foregoing construction is connected with a mainframe 34 of a computer via a cable or cord 35, as shown in FIG. 4.

The pen-type input device 1 connected with the computer mainframe 34 operates as follows.

The pen-type input device 1, while being gripped at its handle 2 with fingers of a user, is moved on the surface of a desk 36 (FIG. 1(b)), for example, in such a manner as to draw a free curve 37 by the ball 6 while the ball 6 is being forced against the surface of the desk 36. In response to the movement of the pen-type input device 1, the ball 6 rotates. In this instance, since the ball 6 (the projected end of the ball 6, in particular) is disposed on an extension of the longitudinal central axis 33 of the handle 2, the pen-type input device 1 can be manipulated in the same manner as pens and pencils used for writing purposes. Thus, the pen-type input device 1 is easy to manipulate and able to draw a complicated curve which requires a fine movement of the pen-type input device 1. In response to the rotation of the ball 6, at least one of the first and second (x-axis and y-axis) rotating detection members 7 and 8 is rotated due to the frictional engagement with the ball 6. During that time, light emitted from each of the light-emitting devices 25 is guided by the light paths 28, 29 onto the pair of laterally spaced patterns 18, 19 of each respective rotating detection member 7, 8. Light reflected back from the light-reflecting portions 16 of the pair of patterns 18, 19 of the at least one rotating detection member 7, 8 being rotated is guided by the light paths 30, 31 onto the two light-sensitive devices 26, 27 which issue two electric signals, respectively, upon detection of the reflected light. In this instance, since the two patterns 18, 19 of alternating light-reflecting and light-absorbing portions 17 and 18 are out of phase in the circumferential direction of each of the rotating detection members 7, 8, the direction of rotation of the ball 6 and the amount of movement of the ball 6 with respect to each of the x-axis and y-axis directions can be detected by subjecting the two electric signals into a phase-comparison achieved by the detecting circuit (not shown) of the corresponding circuit board 22, 23. Data on the direction of rotation and the amount of movement of the ball 6 are inputted into the mainframe 34 of the computer via the cord 35 whereby a free curve, which corresponds to the free curve 37 drawn by the pen-type input device 1, appears on the screen of a display unit 38, as shown in FIG. 4.

The pen-type input device 1 of this invention has various advantages as described below.

The pen-type input device 1 having a pen-like elongated handle 2 can be manipulated in the same manner as pens and pencils of general writing purposes and hence is able to move within a small space to perform an accurate inputting of data on a desired figure, mark, character or the like with respect to a computer. The direction of rotation and the amount of movement of a ball supported at the front end of the pen-type input device can accurately be detected by a pair of rotating detection members which are held in direct contact with the ball. In this instance, a permanent magnet attracts or pulls the ball into contact with the rotating detection members, thereby insuring the smooth rotation of the ball. In addition, a photodetector composed of a light-emitting device and at least one light-sensitive device is packaged on a circuit board. With this arrangement, the overall length of an optical detecting system is considerably reduced, which results in a reduction of size, weight and manufacturing cost of the pen-type input device. Furthermore, the pen-type input device having a rotating ball can be manipulated smoothly without producing unpleasant operation noise. Such a smooth manipulation capability of the pen-type input device is enhanced when the ball is disposed substantially in alignment with a longitudinal central axis of the handle. A pattern pipe mounted on each of the rotating detecting members may be made of metal or molded of synthetic resin. An accurate pattern composed of a series of alternating light-reflecting portions and light-absorbing portions can be formed by etching or molding on an outer peripheral surface of the pattern pipe at a low cost. In the case of the molded pattern pipe, a detected signal has a relatively high level, relieving the work load of the detecting circuit.

Obviously, various minor changes and modifications of the present invention are possible in the light of the above teaching. It is therefore to be understood that within the scope of the appended claims the invention may be practiced otherwise than as specifically described.

What is claimed is:

1. A pen-type input device for a computer, comprising:
   (a) a pen-like elongated handle;
   (b) a ball rotatably supported by said handle with a portion of said ball projecting outwardly from an end of said handle;

(c) first and second rotating detection members mounted in said handle and rotatable, upon frictional engagement with said ball, about first and second axes, respectively, said first and second axes being perpendicular to one another, each of said first and second rotating detection members being composed of a core shaft frictionally engageable with said ball for rotating a corresponding one of said first and second rotating detection members, and a pattern pipe firmly fitted over said core shaft;

(d) at least one pattern composed of a series of alternating light-reflecting portions and light-absorbing portions disposed circumferentially along an outer peripheral surface of said pattern pipe of each of said first and second rotating detection members for detecting a direction of rotation of said ball and an amount of movement of said ball;

(e) first and second circuit boards mounted in said handle and each having a detecting circuit;

(f) first and second photodetectors each composed of a light-emitting device and a light-sensitive device and packaged on said first and second circuit boards, respectively, in corresponding relation to said first and second rotating detection members, respectively; and (g) means associated with each of said first and second photodetectors and defining at least one pair of first and second light paths extending such that light emitted from each respective light-emitting device is guided through said first light path onto said pattern and light reflected back from said pattern is guided through said second light path onto each respective light-sensitive device.

2. A pen-type input device according to claim 1, further including a magnet mounted in said handle for attracting said ball into contact with said core shaft of each of said first and second rotating detection members.

3. A pen-type input device according to claim 1 wherein the number of said at least one pattern is two, said light-reflecting portions and said light-absorbing portions of one of said two patterns being arranged out of phase with said light-reflecting portions and said light-absorbing portions of the other of said two patterns.

4. A pen-type input device according to claim 3 wherein each of said first and second photodetectors further includes an additional light-sensitive device, said defining means defining two pairs of first and second light paths extending such that light emitted from said light-emitting device is guided through said first light paths onto said two patterns and light reflected back from said two patterns is guided through said second light paths onto said light-sensitive device and said additional light-sensitive device.

5. A pen-type input device according to claim 1 wherein said core shaft has a small-diameter portion and a large-diameter portion integral with and frictionally engageable with said ball, and said pattern pipe has an outside diameter substantially equal to the outside diameter of said large-diameter portion of said core shaft and firmly fitted over said small-diameter portion of said core shaft.

6. A pen-type input device according to claim 5 wherein said pattern pipe is made of metal, said light-reflecting portions being composed of mirror-finished portions of said outer peripheral surface of said metal pattern pipe, said light-absorbing portions being composed of satin-finished portions of said outer peripheral surface of said metal pattern pipe.

7. A pen-type input device according to claim 5 wherein said pattern pipe is molded of a synthetic resin, said light-reflecting portions being composed of mirror-like smooth reflective surface portions of said outer peripheral surface of said molded pattern pipe, said light-absorbing portions being composed of satin-like surface portions of said outer peripheral surface of said molded pattern pipe.

8. A pen-type input device according to claim 7 wherein said synthetic resin is mixed with a finely divided inorganic material.

9. A pen-type input device according to claim 7 wherein said synthetic resin is mixed with a powdered metal.

10. A pen-type input device according to claim 1 wherein said ball is disposed in alignment with a longitudinal central axis of said pen-like elongated handle.

* * * * *